United States Patent
Yang

(10) Patent No.: US 6,973,937 B1
(45) Date of Patent: Dec. 13, 2005

(54) VALVE DEVICE FOR FAUCET OR SPRAY GUN

(76) Inventor: Tsai Chen Yang, P.O. Box 63-99, Taichung (TW) 406

(*) Notice: Subject to any disclaimer, the term of this patent is extended or adjusted under 35 U.S.C. 154(b) by 0 days.

(21) Appl. No.: 10/913,628

(22) Filed: Aug. 9, 2004

(51) Int. Cl.[7] .............................................. G05D 7/03
(52) U.S. Cl. .................. 137/119.05; 137/597; 137/801
(58) Field of Search ................. 137/119.03, 119.05, 137/597, 801

(56) References Cited

U.S. PATENT DOCUMENTS

| 3,236,253 | A | * | 2/1966 | Symmons | 137/119.05 |
| 4,874,006 | A | * | 10/1989 | Iqbal | 137/119.05 |
| 5,743,286 | A | | 4/1998 | Ko | |
| 5,813,436 | A | * | 9/1998 | Chen | 137/801 |
| 5,881,754 | A | | 3/1999 | Wei | |
| 6,363,961 | B1 | * | 4/2002 | Wang | 137/119.05 |

* cited by examiner

Primary Examiner—Ramesh Krishnamurthy

(57) ABSTRACT

A valve device includes a receptacle having an upper and a lower ports for coupling to sprayer devices, a front wall having a lower opening, an upper housing attached the front wall for allowing water to flow from the housing into the receptacle, the receptacle includes a vertical partition to separate an interior into a front and a rear chambers which are communicating with the housing and the rear chamber of the receptacle. The vertical partition includes a lower aperture formed by a valve seat. A lateral stem includes a plug slidable to engage with the valve seat of the vertical partition, or to block the lower opening of the front wall, to effectively control the water to flow out through the upper or the lower ports of the receptacle.

4 Claims, 5 Drawing Sheets

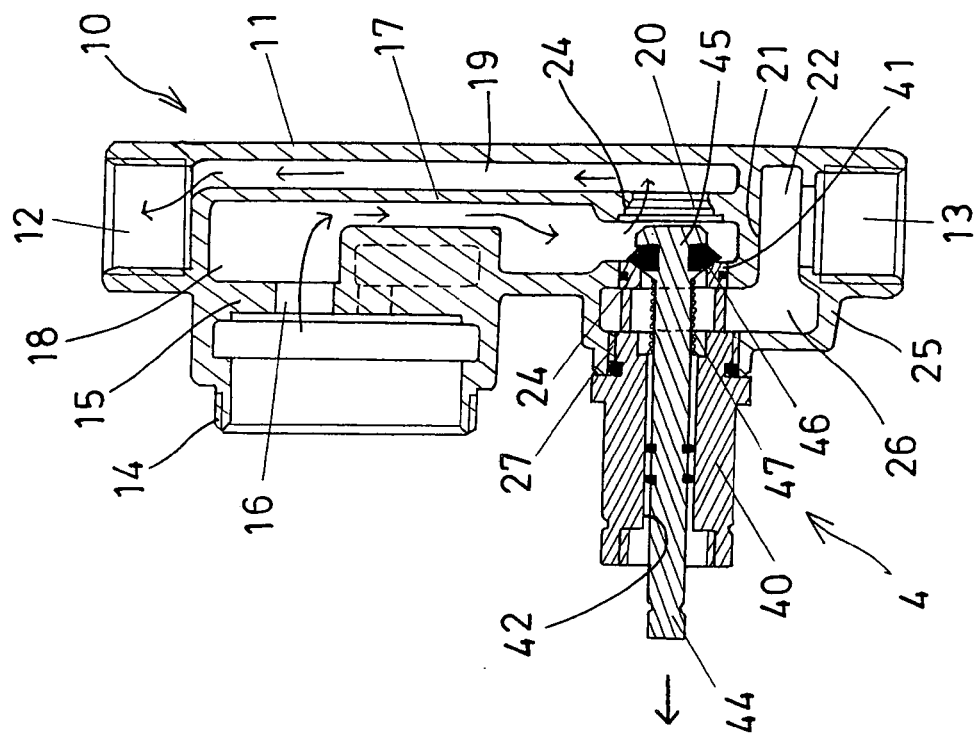
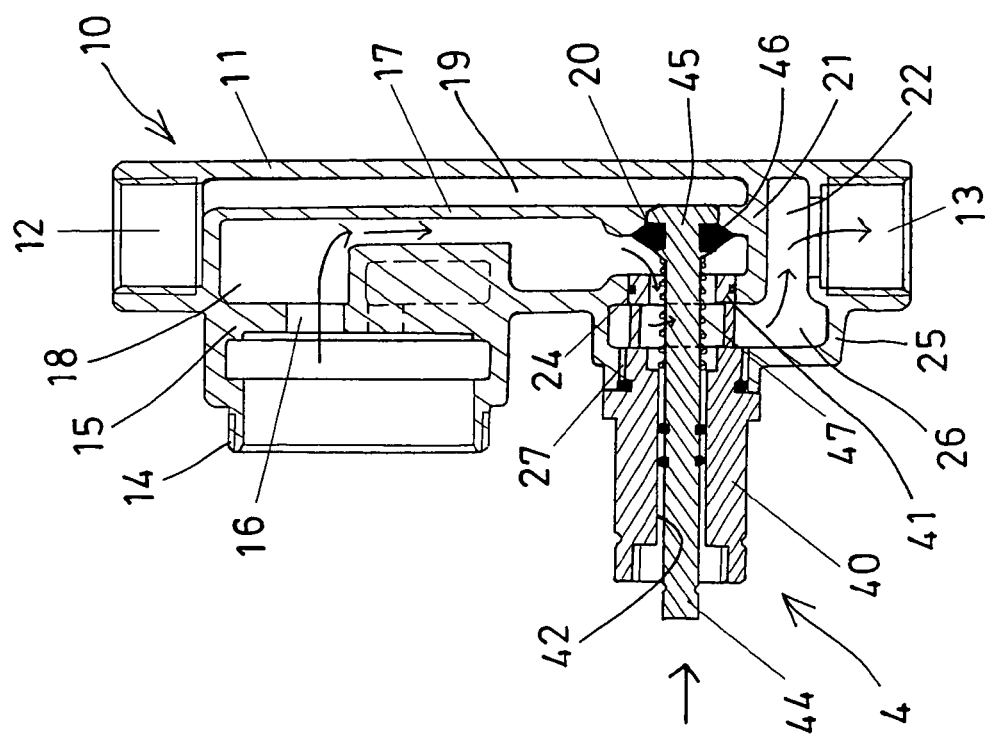

VALVE DEVICE FOR FAUCET OR SPRAY GUN

BACKGROUND OF THE INVENTION

1. Field of the Invention

The present invention relates to a valve device, and more particularly to a valve device having an improved valve receptacle for allowing water to be suitably supplied upwardly to shower nozzles or to be suitably supplied downwardly to spray guns, shower nozzles, or other sprayer devices.

2. Description of the Prior Art

Typical valve devices or control devices for faucets may be used to control water to flow out through faucet mouths or ports only. However, in some circumstances, additional spray guns, shower nozzles, or other sprayer devices may be attached to the control devices or the faucets, for allowing the water to be selectively flown out through the additional spray guns, shower nozzles, or other sprayer devices.

For example, U.S. Pat. No. 5,743,286 to Ko, and U.S. Pat. No. 5,881,754 to Wei disclose two of the typical valve devices or control devices for faucets or the like, and comprising a control valve for controlling the water to selectively flow out through the faucets or additional spray guns, shower nozzles, or other sprayer devices.

However, the typical valve devices or control devices may not be used to control the water to selectively flow upwardly through shower nozzles, or downwardly through spray guns, shower nozzles, or other sprayer devices. In the valve receptacles of the typical valve devices or control devices, a water leaking problem may occur due to wrongly designed valve receptacles.

The present invention has arisen to mitigate and/or obviate the afore-described disadvantages of the conventional faucets or valve devices.

SUMMARY OF THE INVENTION

The primary objective of the present invention is to provide a valve device including an improved valve receptacle for allowing water to be suitably supplied upwardly to shower nozzles or to be suitably supplied downwardly to spray guns, shower nozzles, or other sprayer devices.

In accordance with one aspect of the invention, there is provided a valve device comprising a receptacle including an upper port for coupling to an upward sprayer device, a lower port for coupling to a downward sprayer devices, a front wall having an upper orifice and a lower opening formed therein, the receptacle including an upper housing attached the front wall thereof and communicating with the receptacle via the orifice of the front wall, for allowing water to flow from the housing into the receptacle via the orifice of the front wall, the receptacle including a vertical partition disposed therein, to separate an interior thereof into a front chamber and a rear chamber, the front chamber of the receptacle being communicating with the housing via the orifice of the front wall, and the rear chamber of the receptacle being communicating with the upper port of the receptacle, the vertical partition of the receptacle including a lower aperture formed therein, and defined by a peripheral valve seat, for allowing the front chamber and the rear chamber of the receptacle to be communicated with each other, the receptacle including a lateral panel attached to bottom of the vertical partition, to separate the front chamber and the rear chamber from the lower port of the receptacle, and to form a space to communicate with the lower port of the receptacle, the receptacle including a lower casing attached to the front wall and having a chamber formed therein and communicating with the lower port of the receptacle via the space that is defined between the lateral panel and the lower port of the receptacle, the front wall including a lower opening formed therein, for communicating the front chamber of the receptacle with the chamber of the casing, the casing including a passage formed therein, and laterally aligned with the opening of the front wall and the lower aperture of the vertical partition, a container attached to the housing, a control valve element received in the container to control the water to flow into the housing, and then to flow into the front chamber of the receptacle via the orifice of the front wall, a tubular member attached to the casing to block the passage of the casing, the tubular member including a ring member engaged in the opening of the front wall, to form as a valve seat for the opening of the front wall, and including a bore formed therein, and including at least one pathway formed therein and communicating with the chamber of the casing, to allow the water to flow from the front chamber of the receptacle into the chamber of the casing, via the pathway of the tubular member, and a stem slidably received in the bore of the tubular member, and including a plug for selectively engaging with the ring member of the tubular member and the valve seat of the vertical partition. The plug is selectively engageable with the ring member of the tubular member to block the opening of the front wall, and to prevent the water from flowing into the casing via the opening of the front wall, and to allow the water to flow from the front chamber into the rear chamber of the receptacle via the lower aperture of the vertical partition of the receptacle, and the plug is selectively engageable with the valve seat of the vertical partition to block the lower aperture of the vertical partition of the receptacle, and to prevent the water from flowing from the front chamber into the rear chamber of the receptacle via the lower aperture of the vertical partition, and to allow the water to flow into the casing via the opening of the front wall of the receptacle.

A spring member may further be provided and engaged onto the stem, and engaged between the tubular member and the plug, for biasing the plug to engage with the valve seat of the vertical partition, and to prevent the water from flowing through the lower aperture of the vertical partition and into the rear chamber of the receptacle.

The stem includes a hand grip attached thereto, for moving the stem and the plug relative to the receptacle. A cover may further be provided for shielding the container.

Further objectives and advantages of the present invention will become apparent from a careful reading of the detailed description provided hereinbelow, with appropriate reference to the accompanying drawings.

BRIEF DESCRIPTION OF THE DRAWINGS

FIGS. 5, 6 are cross sectional views similar to FIG. 4, illustrating the operation of the valve device.

DETAILED DESCRIPTION OF THE PREFERRED EMBODIMENT

Figure 1:
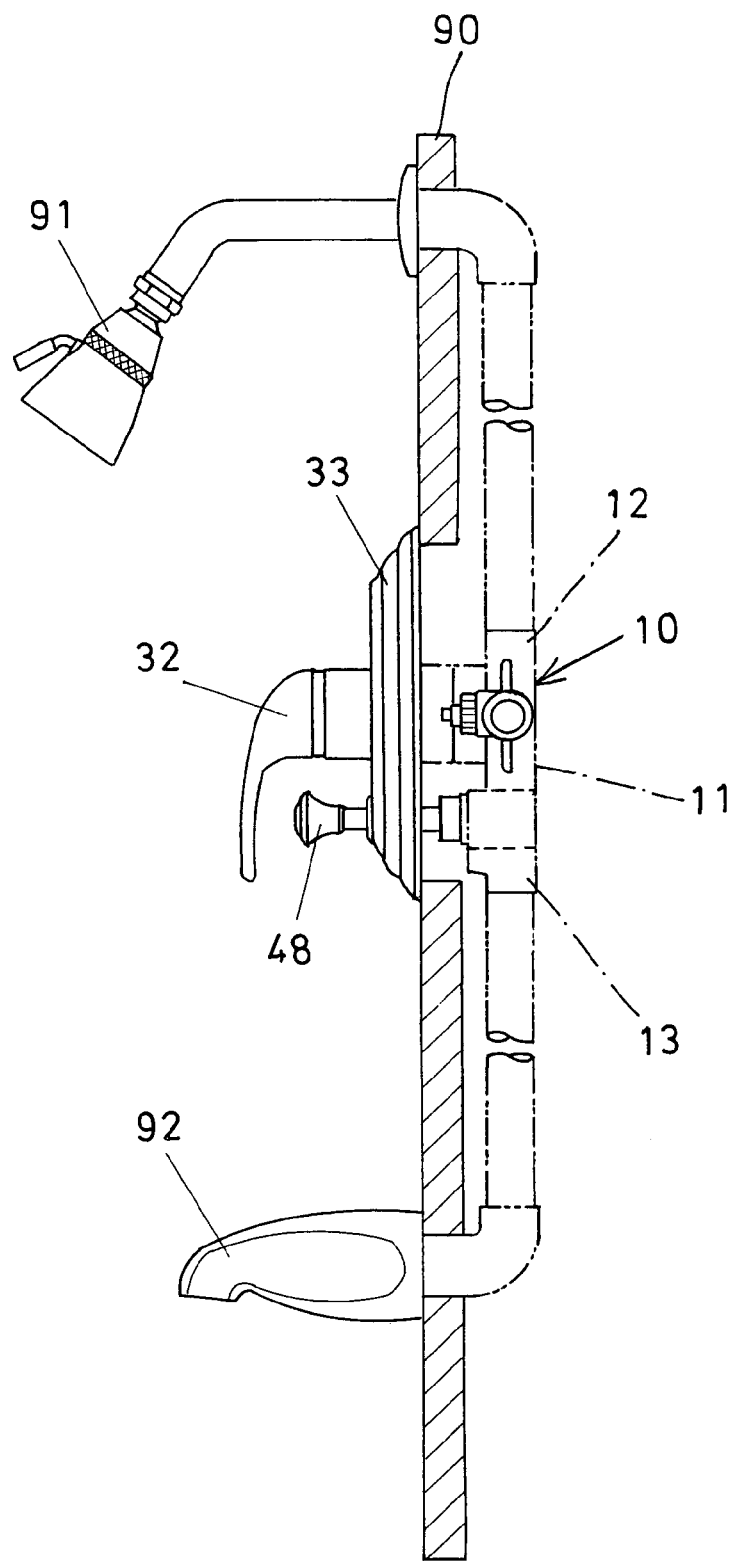
FIG. 1 is a partial cross sectional view illustrating a valve device in accordance with the present invention for attaching to a wall member.
Figure 2:
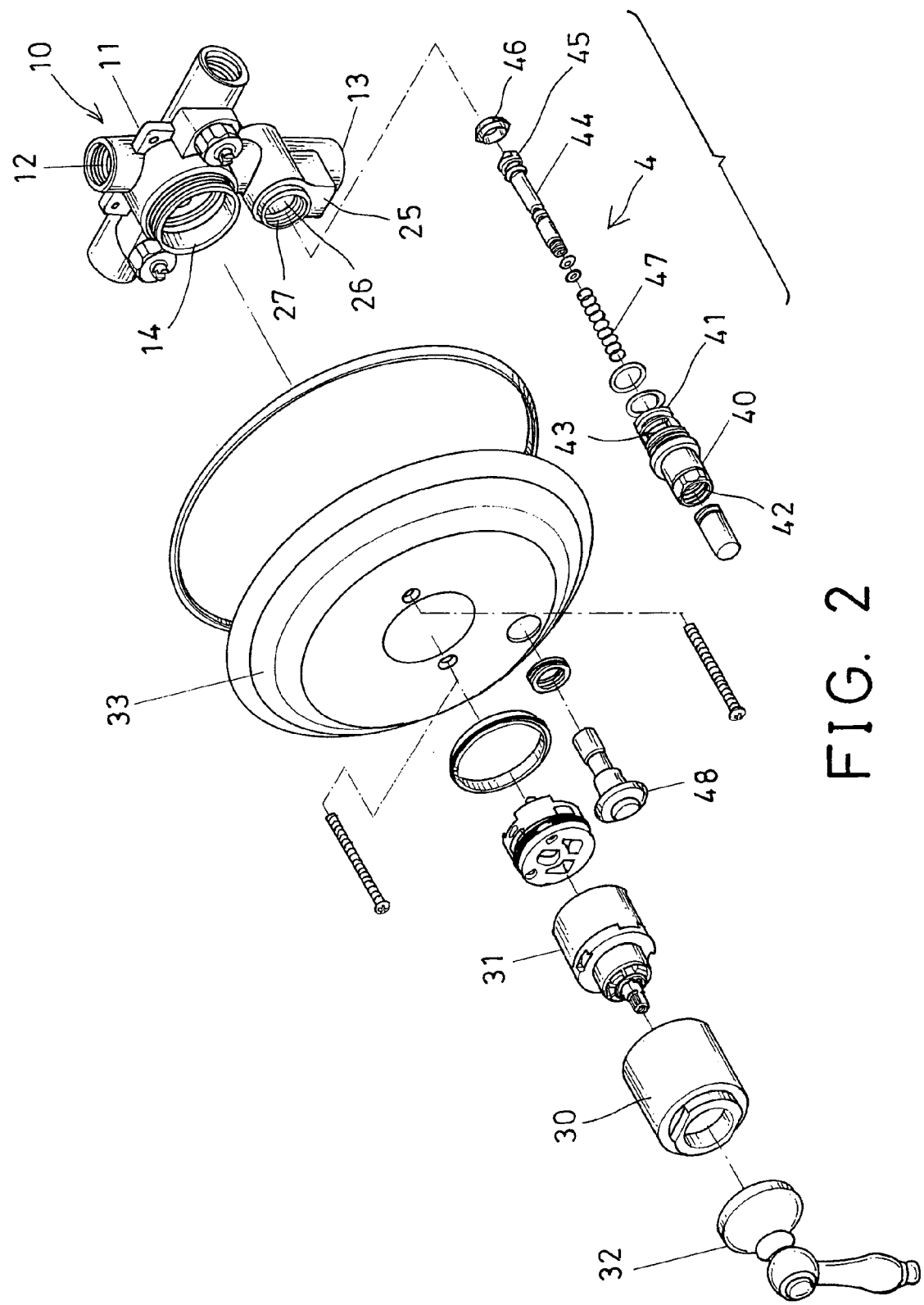
FIG. 2 is an exploded view of the valve device.
Figure 4:
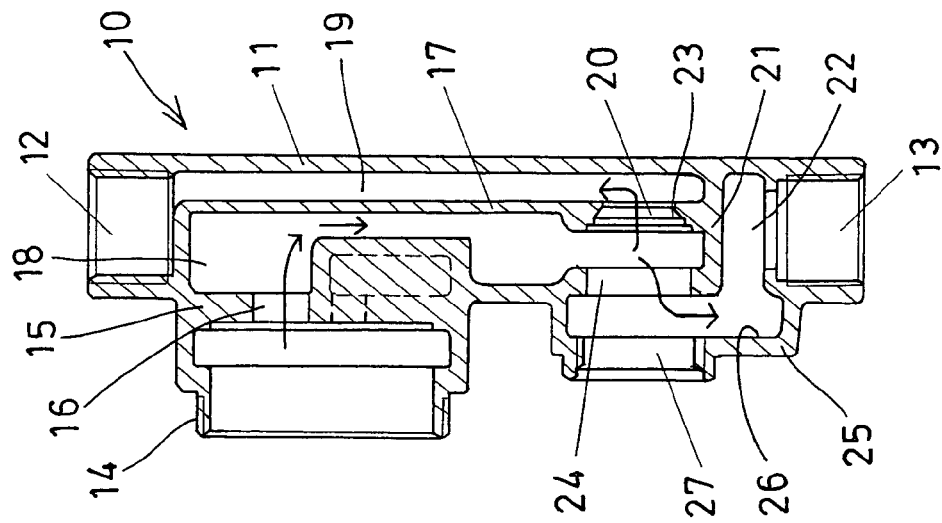
FIG. 4 is a cross sectional view of the valve device, taken along lines 4—4 of FIG. 3.
Figure 3:
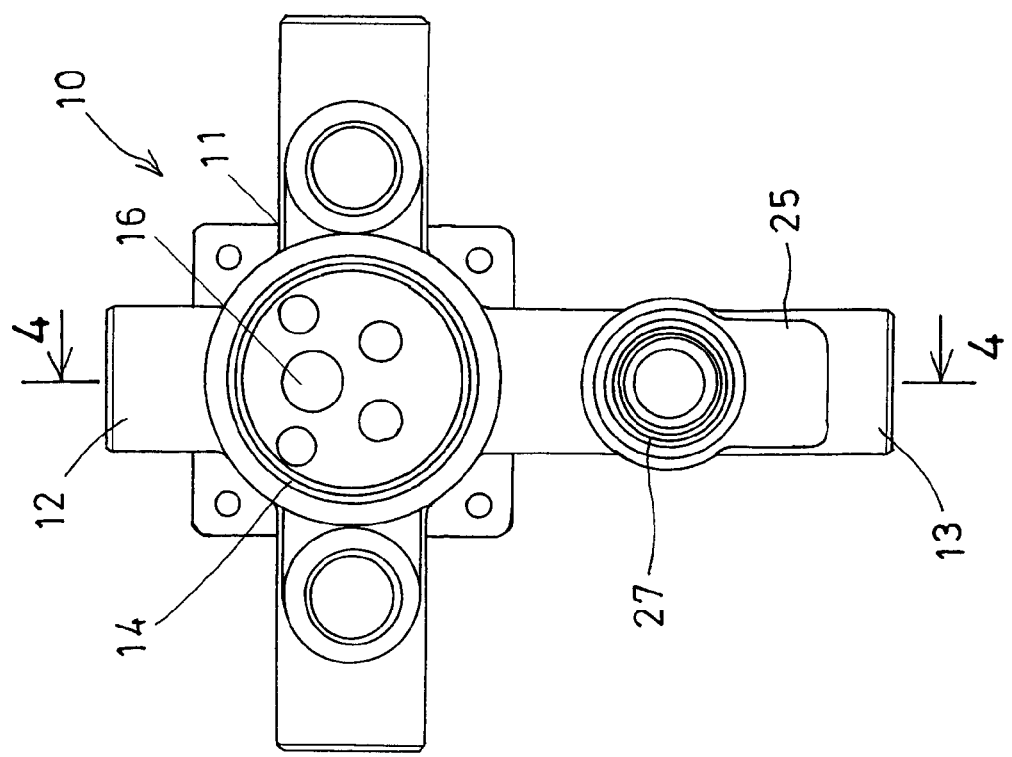
FIG. 3 is a front plan view illustrating a valve receptacle of the valve device.
Figure 7:
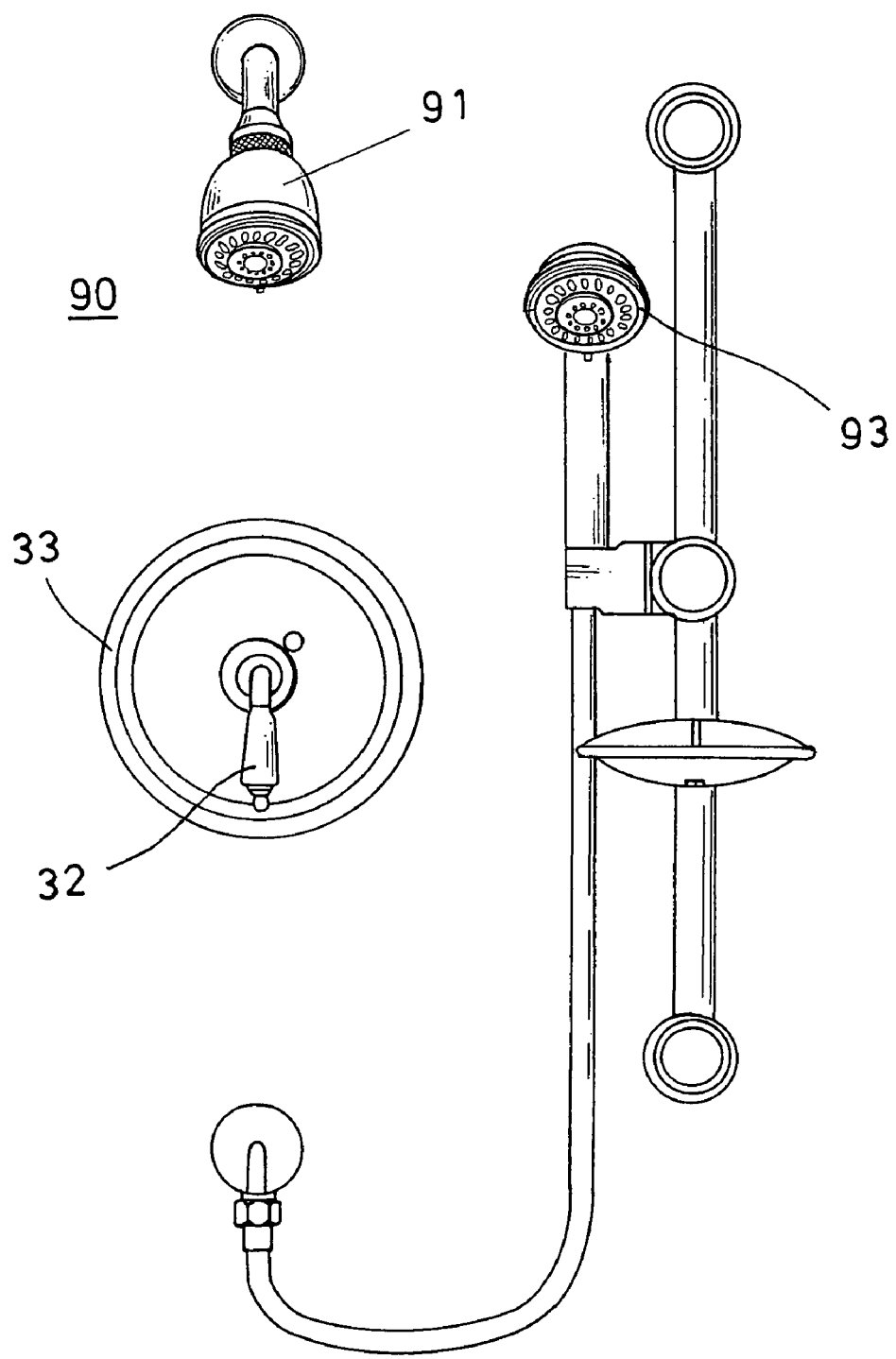
FIG. 7 is a plan vie illustrating the other application of the valve device.

Referring to the drawings, and initially to FIG. 1, a valve device 10 in accordance with the present invention comprises a valve receptacle 11 to be built into wall members 90 (FIG. 1) and including an upper port 12 and a lower port 13 for coupling to upward shower nozzles 91 and to downward spray guns 92, shower nozzles 93 (FIG. 7), or other sprayer devices.

Referring next to FIGS. 2–5, and again to FIG. 1, the receptacle 11 includes the upper port 12 and the lower port 13 formed or provided in the upper and the lower portions thereof, and includes a housing 14 for receiving water and attached to an upper portion of a front wall 15 thereof which has an upper orifice 16 formed therein for communicating the housing 14 with an interior of the receptacle 11.

The receptacle 11 includes an erected or vertical partition 17 disposed in the interior thereof, to separate the interior thereof into a front chamber 18 and a rear chamber 19, in which the front chamber 18 of the receptacle 11 is communicating with the housing 14 via the orifice 16 of the front wall 15, and the rear chamber 19 of the receptacle 11 is communicating with the upper port 12 of the receptacle 11.

The vertical partition 17 of the receptacle 11 includes a lower aperture 20 formed therein, and defined by a peripheral valve seat 23, for allowing the front chamber 18 and the rear chamber 19 of the receptacle 11 to be communicated with each other. The receptacle 11 further includes a horizontal or lateral panel 21 formed or attached to bottom of the vertical partition 17, to separate the front chamber 18 and the rear chamber 19 from the lower port 13 of the receptacle 11, and to form a space 22 that is communicated with the lower port 13 of the receptacle 11.

The receptacle 11 further includes a casing 25 formed or attached to a lower portion of the front wall 15, and having a chamber 26 formed therein and communicating with the lower port 13 of the receptacle 11 via the space 22 that is formed or defined between the lateral panel 21 and the lower port 13 of the receptacle 11.

The front wall 15 includes an opening 24 formed in the lower portion thereof, for allowing the front chamber 18 of the receptacle 11 to be communicated with the chamber 26 of the casing 25. The casing 25 includes a passage 27 formed therein, and preferably laterally aligned with the opening 24 of the front wall 15 and the lower aperture 20 of the vertical partition 17.

A container 30 is attached or secured to the housing 14, a typical control valve element 31 is received in the container 30, and coupled to a handle 32, to control the cold water and/or the hot water to flow into the housing 14, and then to flow into the front chamber 18 of the receptacle 11 via the orifice 16 of the front wall 15. A cover 33 may be secured to the wall 90, to shield the container 30. The control valve element 31 and the container 30 are typical and will not be described in further details.

An actuating device 4 includes a tubular member 40 attached to the casing 25 to block the passage 27 thereof, and the tubular member 40 includes a ring member 41 engaged in the opening 24 of the front wall 15, to form as a valve seat 41 for the opening 24 of the front wall 15, and includes a bore 42 formed therein, and includes one or more pathways 43 formed therein and close to the ring member 41 and communicating with the chamber 26 of the casing 25, to allow the water to flow from the front chamber 18 of the receptacle 11 into the chamber 26 of the casing 25, via the pathways 43 of the tubular member 40.

A stem 44 is slidably received in the bore 42 of the tubular member 40, and includes an enlarged plug 45 formed or provided on one end thereof, and preferably having a gasket 46 attached thereto, for selectively engaging with the ring member 41 or the valve seat 41 for the opening 24 of the front wall 15 (FIG. 5), or for selectively engaging with the lower aperture 20 or the valve seat 23 of the vertical partition 17 (FIG. 6).

A spring member 47 may be engaged onto the stem 44, and engaged between the tubular member 40 and the plug 45, for biasing the plug 45 to engaged with the lower aperture 20 or the valve seat 23 of the vertical partition 17 (FIG. 6), and thus to prevent the water from flowing through the lower aperture 20 of the vertical partition 17 and into the rear chamber 19 of the receptacle 11. A knob or hand grip 48 may be attached to the stem 44 for moving the stem 44 and thus the plug 45 relative to the receptacle 11.

In operation, as shown in FIG. 5, when the stem 44 is moved or pulled outwardly relative to the tubular member 40, the plug 45 of the stem 44 may be moved to engage with the ring member 41 or the valve seat 41 for the opening 24 of the front wall 15, such that the water from the housing 14 may flow into the front chamber 18 and then into the rear chamber 19 of the receptacle 11, and then may flow out through the upper port 12 and the shower nozzles 91.

At this moment, the stem 44 and/or the hand grip 48 may be latched to the tubular member 40 (not shown), to solidly retain the plug 45 in engagement with the ring member 41 or the valve seat 41 for the opening 24 of the front wall 15.

As shown in FIG. 6, when the stem 44 is moved or forced inwardly relative to the tubular member 40, the plug 45 of the stem 44 may be moved to engage with the valve seat 23 of the lower aperture 20 of the vertical partition 17, such that the water from the housing 14 may flow into the front chamber 18 and then into the space 26 of the casing 25 via the opening 24 of the front wall 15 of the receptacle 11, and then may flow out through the lower port 13 and the downward spray guns 92 (FIG. 1), or shower nozzles 93 (FIG. 7), or other sprayer devices.

At this moment, the plug 45 may be biased and solidly retained in engagement with the valve seat 23 of the vertical partition 17 by the spring member 47, to prevent the water from flowing from the front chamber 18 into the rear chamber 19 of the receptacle 11.

It is to be noted that the vertical partition 17 and the front chamber 18 and the rear chamber 19 and the lateral panel 21 and the space 22 are specially the designed or provided in the receptacle 11, and the stem 44 is laterally moveable to allow the plug 45 to solidly and selectively engage with the ring member 41 or the valve seat 41 for the opening 24 of the front wall 15, or to engage with the valve seat 23 of the lower aperture 20 of the vertical partition 17, to allow the water to be effectively controlled to selectively flow out through the upper port 12 and the shower nozzles 91, or to flow out through the lower port 13 and the downward spray guns 92, or shower nozzles 93, or other sprayer devices.

Accordingly, the valve device in accordance with the present invention includes an improved valve receptacle for allowing water to be suitably supplied upwardly to shower nozzles or to be suitably supplied downwardly to spray guns, shower nozzles, or other sprayer devices.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve device comprising:

a receptacle including an upper port for coupling to an upward sprayer device, a lower port for coupling to a downward sprayer devices, a front wall having an upper orifice and a lower opening formed therein, said receptacle including an upper housing attached said front wall thereof and communicating with said receptacle via said orifice of said front wall, for allowing water to flow from said housing into said receptacle via said orifice of said front wall, said receptacle including a vertical partition disposed therein, to separate an interior thereof into a front chamber and a rear chamber, said front chamber of said receptacle being communicating with said housing via said orifice of said front wall, and said rear chamber of said receptacle being communicating with said upper port of said receptacle, said vertical partition of said receptacle including a lower aperture formed therein, and defined by a peripheral valve seat, for allowing said front chamber and said rear chamber of said receptacle to be communicated with each other, said receptacle including a lateral panel attached to bottom of said vertical partition, to separate said front chamber and said rear chamber from said lower port of said receptacle, and to form a space to communicate with said lower port of said receptacle, said receptacle including a lower casing attached to said front wall and having a chamber formed therein and communicating with said lower port of said receptacle via said space that is defined between said lateral panel and said lower port of said receptacle, said front wall including a lower opening formed therein, for communicating said front chamber of said receptacle with said chamber of said casing, said casing including a passage formed therein, and laterally aligned with said opening of said front wall and said lower aperture of said vertical partition, a container attached to said housing, a control valve element received in said container to control the water to flow into said housing, and then to flow into said front chamber of said receptacle via said orifice of said front wall, a tubular member attached to said casing to block said passage of said casing, said tubular member including a ring member engaged in said opening of said front wall, to form as a valve seat for said opening of said front wall, and including a bore formed therein, and including at least one pathway formed therein and communicating with said chamber of said casing, to allow the water to flow from said front chamber of said receptacle into said chamber of said casing, via said at least one pathway of said tubular member, and a stem slidably received in said bore of said tubular member, and including a plug for selectively engaging with said ring member of said tubular member and said valve seat of said vertical partition, said plug being selectively engageable with said ring member of said tubular member to block said opening of said front wall, and to prevent the water from flowing into said casing via said opening of said front wall, and to allow the water to flow from said front chamber into said rear chamber of said receptacle via said lower aperture of said vertical partition of said receptacle, and said plug being selectively engageable with said valve seat of said vertical partition to block said lower aperture of said vertical partition of said receptacle, and to prevent the water from flowing from said front chamber into said rear chamber of said receptacle via said lower aperture of said vertical partition, and to allow the water to flow into said casing via said opening of said front wall of said receptacle.

2. The valve device as claimed in claim 1 further comprising a spring member engaged onto said stem, and engaged between said tubular member and said plug, for biasing said plug to engage with said valve seat of said vertical partition, and to prevent the water from flowing through said lower aperture of said vertical partition and into said rear chamber of said receptacle.

3. The valve device as claimed in claim 1, wherein said stem includes a hand grip attached thereto, for moving said stem and said plug relative to said receptacle.

4. The valve device as claimed in claim 1 further comprising a cover for shielding said container.

* * * * *